United States Patent
Fimml

[11] 3,921,985
[45] Nov. 25, 1975

[54] CONTACTLESS FLOW-GUIDANCE SYSTEM

[76] Inventor: Hans Fimml, Klausenerstrasse 4, A-6020 Innsbruck, Austria

[22] Filed: Jan. 4, 1974

[21] Appl. No.: 430,878

[30] Foreign Application Priority Data
Jan. 5, 1973  Austria .............................. 8984/73

[52] U.S. Cl. ................ 277/22; 277/235 A; 92/162; 123/119 E
[51] Int. Cl.² .......................................... F16J 15/00
[58] Field of Search ............ 277/22, 235 A; 92/162; 123/119 E, 191 A, 193 CP

[56] References Cited
UNITED STATES PATENTS

| | | | |
|---|---|---|---|
| 3,038,731 | 6/1962 | Milleron | 277/22 |
| 3,059,910 | 10/1962 | Moriya | 123/119 E |
| 3,110,294 | 11/1963 | Nyman | 123/119 E |
| 3,299,905 | 1/1967 | Smirra | 277/22 X |

*Primary Examiner*—Samuel B. Rothberg
*Attorney, Agent, or Firm*—Karl F. Ross; Herbert Dubno

[57] ABSTRACT

A flow of hot gases, e.g. in a mixing tube of a jet engine or in a cylinder of an internal-combustion engine, is kept out of contact with a confining surface by an electron-emissive coating on that surface held at a negative potential, the work function of the coating being lowered by the heat of the gases and/or by other heating means. The system can be used to minimize frictional resistance between the gas and a tube wall, or to block gas leakage between a cylinder and its piston.

6 Claims, 8 Drawing Figures

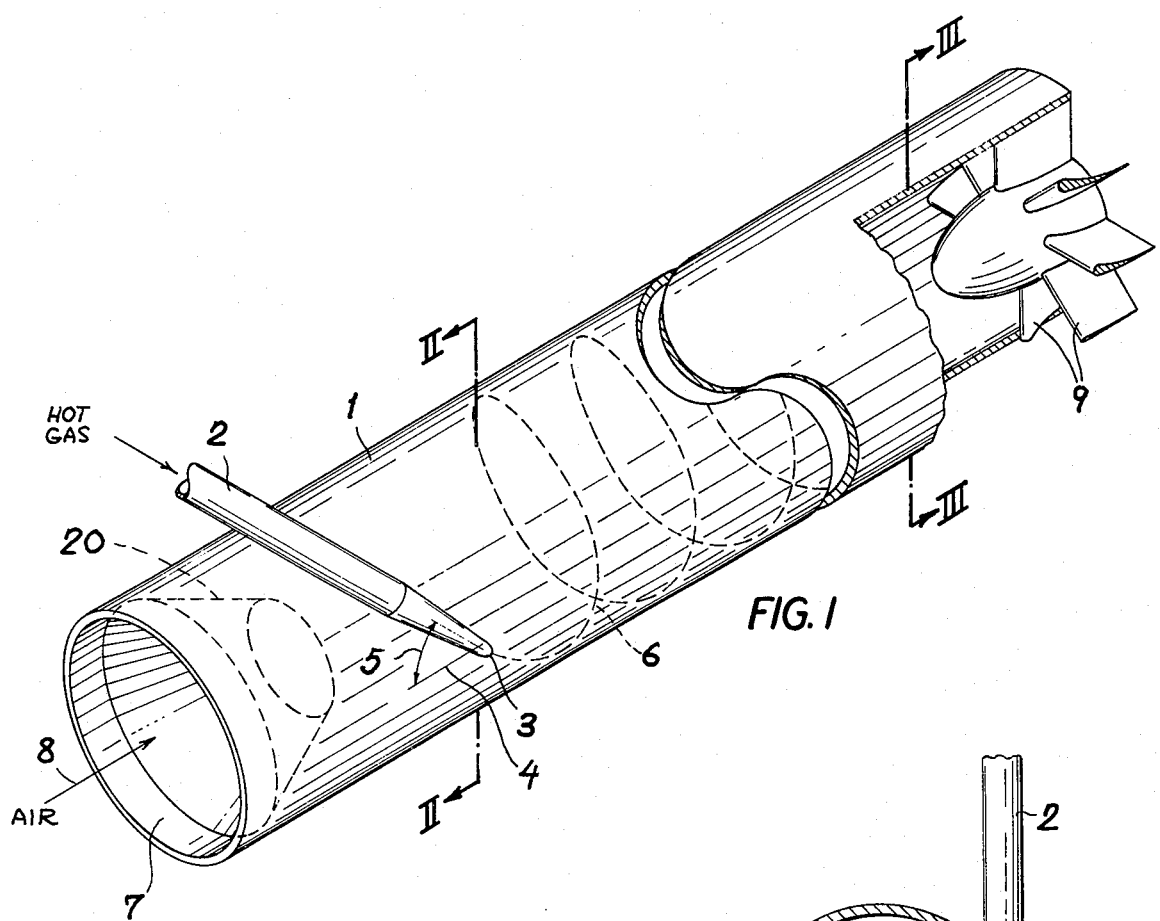
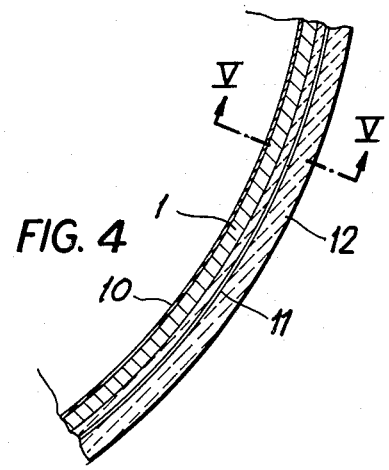
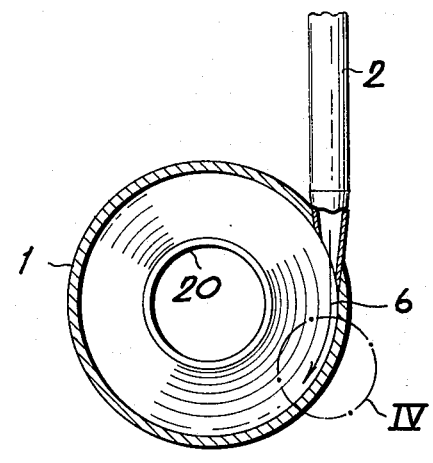
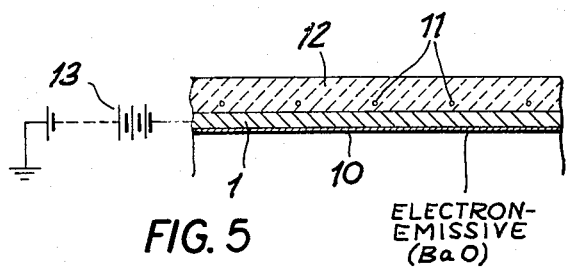
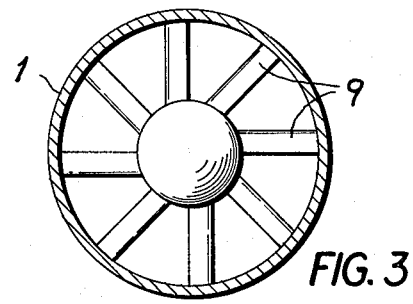

CONTACTLESS FLOW-GUIDANCE SYSTEM

1. Field of the Invention

My present invention relates to a system for the contactless guidance of hot gases along stationary or moving surfaces forming part of a flow path therefor.

2. Background of the Invention

There are many instances in which a gas (e.g. a hydrocarbon or a mixture of hydrocarbons) heated to a temperature on the order of 1000°K must be confined in a duct, a piston cylinder or some other enclosure, this temperature being insufficient to ionize the gas so as to form a plasma which could be guided electrostatically or electromagnetically to prevent it from contacting the confining walls. Such contactless guidance, however, is desirable even at these relatively low temperatures for a variety of reasons, e.g. to reduce friction or to prevent chemical interaction.

3. Objects of the Invention

The general object of my present invention, therefore, is to provide a system for conveying such hot gases, especially hydrocarbons, in a contactless manner along a guide surface.

A more particular object of my invention is to provide a highly efficient mixer tube for the output of a jet-engine reactor in which a primary gas stream coming from that reactor enters a stream of secondary air to be intermingled therewith in order to enhance the thrust.

Another more particular object is to provide means in an internal-combustion engine forming a contactless seal for hot fuel/air mixtures between two relatively moving guide surfaces such as those of a piston and a cylinder.

4. Summary of the Invention

In accordance with my present invention, a guide surface exposed to an ionizable gaseous fluid to be conveyed, such as a hydrocarbon gas, carries a thermionic coating subjected to the action of heating means for raising the temperature of that coating to an electron-emitting level. The coating or some other part of that surface may be biased with a negative potential repelling the fluid upon ionization thereof by the emitted electrons.

In many instances the heating means designed to lower the work function of the coating may be constituted by a source of hot gas forming part of the flow to be conveyed, such as the aforementioned primary gas stream. In other cases the heat of the conveyed gases is supplemented by an electric resistance element imbedded in the guide structure immediately below the electron-emissive surface thereof.

I have found that barium oxide is particularly effective as an electron-emitting compound at a temperature of about 1000°K (corresponding to 727°C). In that case, a heat input of about $2W/cm^2$ yields an emission current of 2 $amp/cm^2$. Compounds of other alkali, alkaline-earth and rare-earth metals, e.g. cesium oxide or lanthanum hexaboride, as well as mixtures thereof could also be used.

The electrons released from the thermionic coating attach themselves to the molecules of the passing gas and effectively ionize same, the resulting negative charge preventing any contact between the gas and the coating which is negatively biased with reference to the rest of the structure.

If the gas stream to be conveyed is a jet issuing from a reactor, the thermionic coating is disposed on the inner peripheral surface of a mixer tube in which this primary gas stream mingles with a flow of secondary air. In conventional tubes of this nature, the primary gas stream is axially introduced through a central nozzle to entrain a surrounding volume of ambient air; at the outlet of the mixer tube, the diluted jet has a thrust $S = m.v.$ representing the mass-flow rate of the gas, which is larger than the thrust of the jet alone at the nozzle exit but which represents a considerable loss of kinetic energy $E = m.v^2/2$. The jet, expanding radially upon leaving the nozzle, gradually loses its identity as it accelerates the surrounding secondary air in an ever-widening mixing zone. The intermingling of the combustion gases in the jet with the ambient air is accompanied by considerable turbulence which consumes a great deal of kinetic energy and accounts for the poor efficiency of conventional systems of this character.

In my improved system the primary gas stream or jet is laterally introduced into the mixer tube so as to be trained generally tangentially upon its inner peripheral surface which is partly or completely coated with the thermionic material. The nozzle lies skew to the tube axis at an acute angle, i.e. between 0° and 90°, as measured with reference to an axial plane passing through the point of injection. This angle may be varied in dependence upon various operating parameters including, for example, the initial velocity (if any) imparted to the secondary air stream upon its entry into the mixer tube. Thus, there results a helicoidal gas flow of shorter or longer pitch which sets the entrained secondary air in vortical motion so as to generate a centrifugal force driving the secondary-air particles into intimate contact with the injected reaction gases and helping maintain the continuity of the jet for a prolonged period. The homogenization of the gas mixture is thereby accelerated so that a relatively short mixer tube can be used. However, without my contactless guidance system such an arrangement would not be practical in view of the large energy losses due to the friction between the tube wall and the swirling high-velocity jet.

According to another feature of my invention, the electron-emissive coating is utilized to form a contactless seal between two relatively movable elements, such as a piston and a cylinder, whose confronting surfaces define a narrow gap penetrated by a hot gaseous fluid, e.g. the combustion gases of an automotive engine. In that case the coating is carried on one of the two confronting surfaces, preferably the piston surface, in order to limit the axial extent of that coating. A potential barrier disposed downstream of the electron-emissive coating within the gap, e.g. on the side remote from the high-pressure side of the piston, effectively prevents the escape of the charged gases through the gap without the need for conventional sealing rings. Such a potential barrier can be formed by a peripheral rib on the piston, spaced from the cylinder, to which the negative biasing voltage is applied.

5. Brief Description of the Drawing

The above and other features of my invention will now be described in detail with reference to the accompanying drawing in which:

FIG. 1 is a perspective view of a mixer tube for a jet-engine thruster embodying my invention;

FIG. 2 is a cross-sectional view taken on the line II—II of FIG. 1;

FIG. 3 is another cross-sectional view taken on the line III—III of FIG. 1;

FIG. 4 is a fragmentary detail view of the area IV of FIG. 2, drawn to a larger scale;

FIG. 5 is a fragmentary longitudinal sectional view taken on the line V—V of FIG. 4;

6. Specific Description

Figure 6:
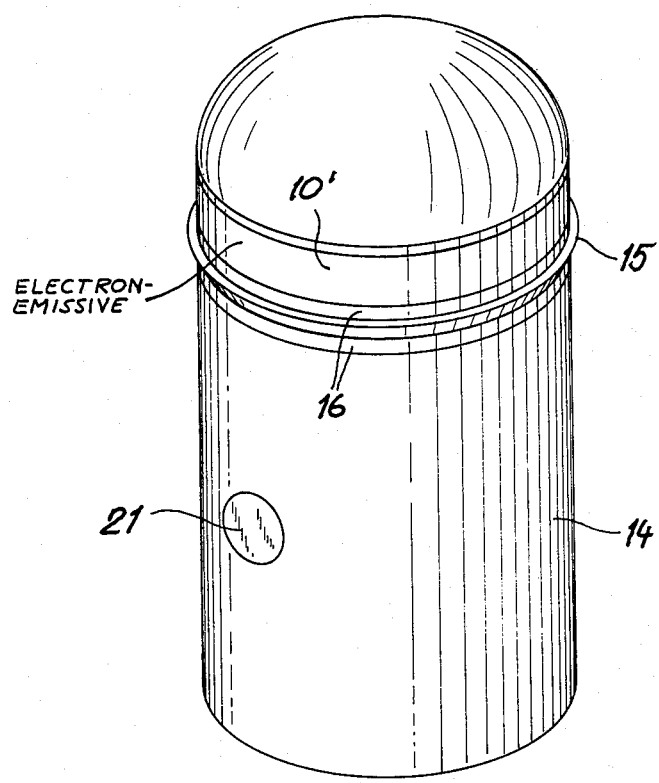
FIG. 6 is a perspective view of a piston of an internal-combustion engine provided with a contactless gas seal according to my invention.

In FIGS. 1–5 I have shown a mixer tube 1 forming part of a thruster of a turbojet engine whose reactor feeds a hot combustion gas at high speed to a nozzle 2 which lies skew to the tube axis. The nozzle, opening into the tube 1 at a port 3, includes an acute angle 5 with a generatrix 4 passing through the entrance port 3. The attitude of nozzle 2 may be adjusted, by suitable means not shown, to vary the angle 5 and with it the inclination of the nozzle with reference to a plane including the tube axis and the generatrix 4.

As indicated in FIGS. 1 and 2, the hot gas injected into the tube 1 through port 3 passes on a helicoidal path 6 along the inner peripheral wall of the tube. In spiraling toward the exit end of tube 1, i.e. to the right as viewed in FIG. 1, the gas entrains a stream of secondary air 8 entering that tube at 7, this air being thereby set in vortical motion about the tube axis so as to mix intimately with the hot gases from nozzle 2 as discussed above. Upon approaching the tube outlet, the resulting gas mixture flows past a set of inclined vanes 9 which serve to arrest the spin and to convert the swirling motion into an axial flow. Similar guide vanes, not shown, could be installed at the inlet end 7 to impart a preliminary rotary motion to the entering air flow.

Nozzle 2 is representative of several such nozzles which may open into the tube 1 at different locations to deliver component jets which merge into the helicoidal primary flow 6.

In accordance with the present invention, and for the purpose of reducing the frictional energy losses in the mixer tube, I provide the inner wall surface of that tube with a thermionic coating 10, preferably of barium oxide, whose work function is sufficiently lowered at an operating temperature of about 1000°K to emit electrons into the interior of the tube. If the gas temperature is insufficient to cause the emission of electrons, the necessary heat may be supplied by an electric resistance element 11, in the form of an electrical wire, advantageously imbedded in a refractory layer 12 of nonconductive material serving as an external heat shield for the tube 1. The combination of coating 10 and layer 12 extends over the entire tube periphery but may be limited to a fraction of the length of that tube starting at the port 3. In order to delay the cooling of the injected gas stream by the entrained secondary air, and thereby to reduce the amount of supplemental heat required, the air stream 8 may be funneled through a converging guide ring 20 keeping it away from the inner tube wall ahead of port 3. The staggering of several nozzles 2 along the tube axis further improves the thermal efficiency of the system, as does the presence of the external heat shield 12.

As illustrated in FIG. 5, coating 10 is maintained at a negative potential with reference to the remainder of the structure, and therefore also to the body of the gas flow, by a source of biasing voltage here shown as a battery 13. As already explained, this negative potential repels the electron-charged gases from the vicinity of the tube wall so that the flow 6 is guided therealong with little or no physical contact.

It will be apparent that the jet nozzle 2, or a similar nozzle in the output of a jet engine, could also be internally clad with a thermionic coating of the type shown at 10 in order to reduce the friction between the gas flow and the nozzle wall.

By the same token, other elements coming into contact with a hot gas flow may be coated and biased in the aforedescribed manner for the purpose of preventing direct contact between the guide surface and the gas. This includes, for example, the turbine blades of a turbojet engine, both on the stator and on the rotor thereof, which will therefore operate with increased efficiency. In both instances, i.e. in the cases of the nozzle and of the turbine blades, the conveyed fluid is generally hot enough to obviate the need for supplemental heating means.

The application of a negative biasing potential further reduces the work function of the thermionic coating; if the temperature is high enough, this bias may be limited to just the voltage level necessary to repel the charged gas. Even with high biasing voltages, however, the consumption of electric energy on account of the electronic emission will be negligible since the ionized gas draws practically no current.

Figure 7:
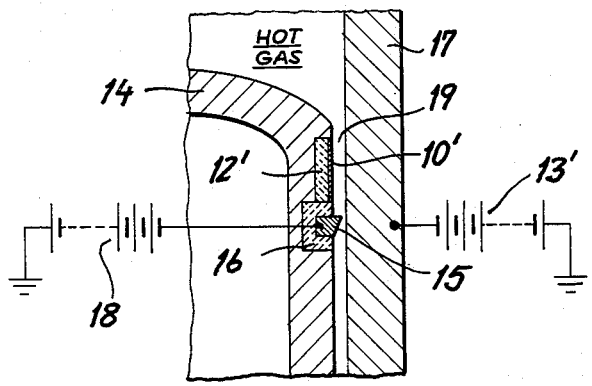
FIG. 7 is an enlarged cross-sectional view of part of the piston of FIG. 6 and of an associated cylinder.

In FIGS. 6 and 7 I have shown a piston 14 of an internal-combustion engine reciprocating in a cylinder 17 whose upper part forms a combustion chamber for a fuel/air mixture as is well known per se. During the power stroke, the exploding gas mixture drives the piston down and penetrates into a gap 19 between two confronting surfaces of the piston and the cylinder, i.e. the outer wall surface of the former and the inner wall surface of the latter. Piston 14 carries the usual knuckle pin 21 linking it with a nonillustrated crank drive.

In accordance with my invention I provide the peripheral surface of piston 14 with a thermionic coating 10' as described above, this coating being supported by an annular insert 12' of refractory material. As illustrated at 12" in FIG. 8, the insert may be enlarged to accommodate a heating coil 11" close to the coating 10"; in that instance the piston 14 may be internally reinforced at 22 in order to provide the piston with a substantially constant wall thickness.

The electron-emissive coating 10' or 10" covers but a narrow annular zone of piston 14 at the upstream end of gap 19. Below that zone, piston 14 is provided with a sharp-edged peripheral rib 15 which is constituted by a hoop of trapezoidal cross-section partly imbedded in a refractory annular insert 16 acting as a heat barrier. Rib 15 is negatively biased by a battery 18 to serve as a potential barrier keeping the ionized gas in the upper part of gap 19 and preventing its downward escape. A battery 13' biases the cylinder 17 negatively with reference to other parts of the structure, e.g. the nonillustrated cylinder head, in order to provide an electrostatic field driving the ionized gas away from its surface confronting the coating 10', thereby counteracting the downwardly directed gas pressure in gap 19.

Figure 8:
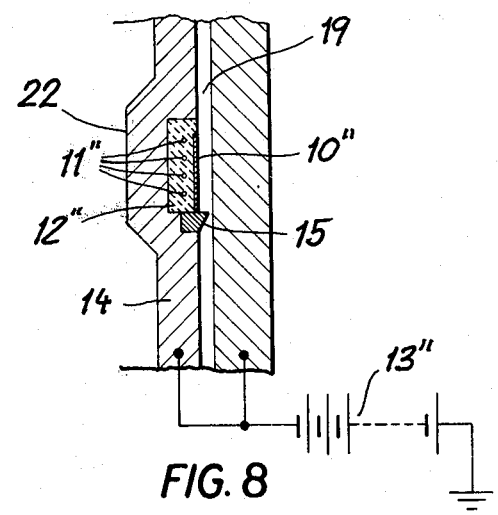
FIG. 8 is a view similar to FIG. 7, illustrating a modification.

In the modified system of FIG. 8, a single battery 13" applies negative bias to the piston 14 and the cylinder 17, the heat barrier 16 being here omitted with the rib-forming hoop 15 directly inserted in a peripheral recess of piston 14 and in contact with the coating 10" so that both the rib and the coating are held at the same negative potential.

Naturally, several contactless gas seals as shown in FIGS. 7 or 8 may be disposed in cascade at axially spaced locations on the same piston 14 for more effective leakage prevention.

In view of the very small gas volume present in the gap 19, the rate of electron emission from the coating 10' or 10" need not be high in order to bring about the desired ionization. The use of supplemental heating means 11" (FIG. 8) has the advantage of reducing temperature fluctuations during an operating cycle of the engine; only a small expenditure of electrical energy is needed for this purpose. With piston 14 and cylinder 17 charged to the same voltage level, the biasing potential of battery 13" can be quite high without risking any objectionable discharges across gap 19.

I claim:

1. A contactless seal between a piston member and a cylinder member having confronting surfaces closely spaced from each other by a narrow peripheral gap, said cylinder member forming a chamber for a fluid to be confined, said seal comprising a thermionic coating on the confronting surface of one of said members, heating means for raising the temperature of said coating to an electron-emissive level, and biasing means for maintaining the region of said gap at a potential more negative than that of a part of said chamber remote from said gap for repelling said fluid upon ionization thereof by the emitted electrons.

2. A seal as defined in claim 1 wherein said piston and cylinder members form part of an internal-combustion engine, said chamber being a combustion chamber forming part of said heating means.

3. A contactless seal as defined in claim 1 wherein said heating means comprises an electric resistance element carried on said one of said members adjacent said confronting surface thereof.

4. A contactless seal as defined in claim 3 wherein said one of said members is provided with a refractory layer adjacent said coating, said resistance element being imbedded in said layer.

5. A contactless seal as defined in claim 1 wherein one of said confronting surfaces is provided with an annular zone negatively biased with reference to said remote part to form a potential barrier downstream of said coating within said gap.

6. A contactless seal as defined in claim 5 wherein said coating is carried on said piston member, said annular zone being constituted by a peripheral rib of said piston member spaced from said cylinder member.

* * * * *